United States Patent [19]

Herbst et al.

[11] Patent Number: 4,977,566
[45] Date of Patent: Dec. 11, 1990

[54] PURGED CAVITY SOLID STATE TUNABLE LASER

[75] Inventors: Richard L. Herbst, Palo Alto; Anthony J. Alfrey, Half Moon Bay; Shawn D. Streeby, Sunnyvale, all of Calif.

[73] Assignee: Spectra-Physics, Inc., Mountain View, Calif.

[21] Appl. No.: 473,861

[22] Filed: Feb. 2, 1990

[51] Int. Cl.[5] ............................................. H01S 13/00
[52] U.S. Cl. ......................................... 372/33; 372/20
[58] Field of Search ...................... 372/33, 20, 71, 40, 372/41, 92

[56] References Cited

U.S. PATENT DOCUMENTS 3,697,889 10/1972 Dewey, Jr. ............................ 372/20
4,229,709 10/1980 McMahan .............................. 372/33

OTHER PUBLICATIONS

Burleigh Instruments, Inc., "F-Center Lasers, Retro Grating Mounts and PAS Cells", FPR 258 281, Feb. 1981.

Primary Examiner—Frank Gonzalez
Assistant Examiner—Susan S. Morse
Attorney, Agent, or Firm—Fleisler, Dubb, Meyer & Lovejoy

[57] ABSTRACT

A tunable solid state laser having a titanium:sapphire grain medium and a birefringent filter mounted within a resonant cavity is provided. The resonant cavity is longitudinally pumped. The cavity is enclosed in a casing which has a small window admitting the pump beam into the resonant cavity, and a small window with an anti-reflection coating allowing the laser output to exit the casing. The casing is maintained at a positive pressure of nitrogen gas during operation of the laser to purge the resonant cavity of air and water vapor.

15 Claims, 5 Drawing Sheets

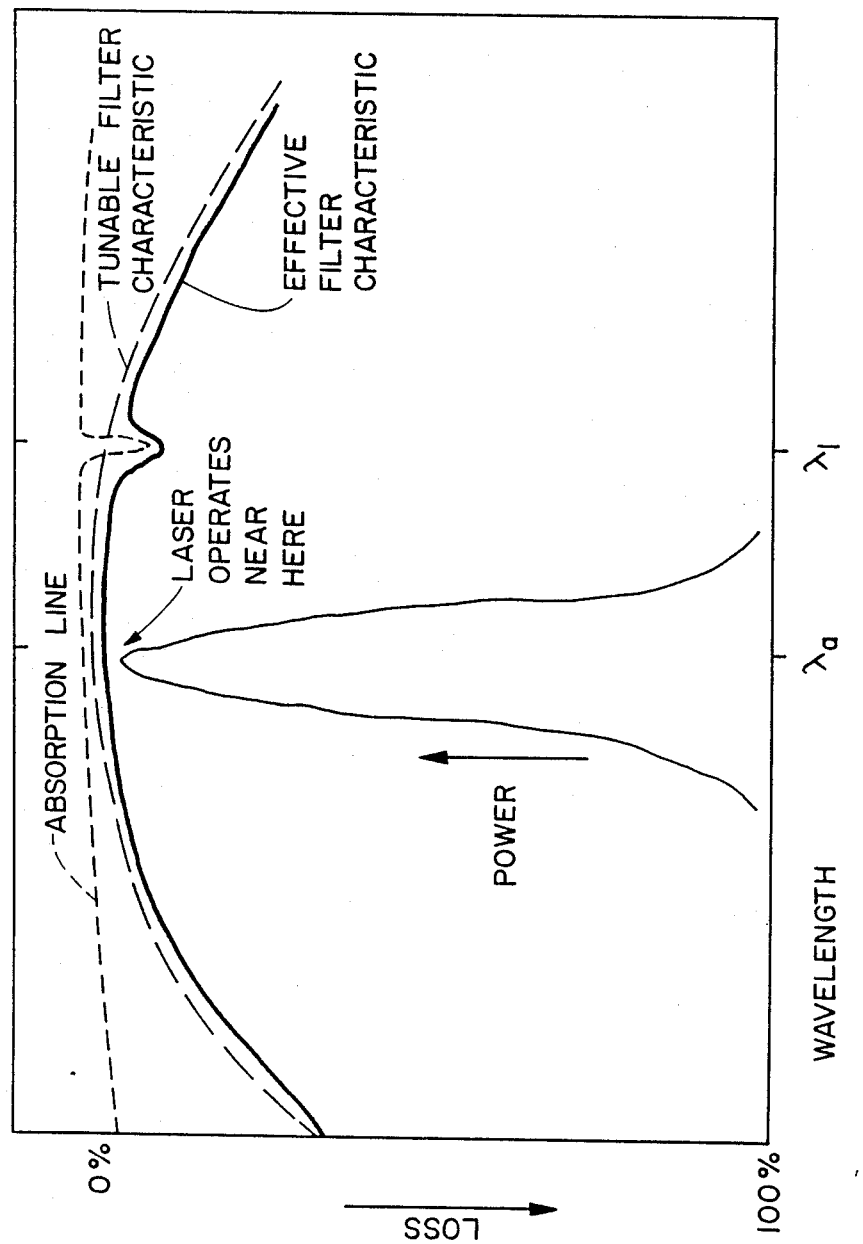
FIG._1.

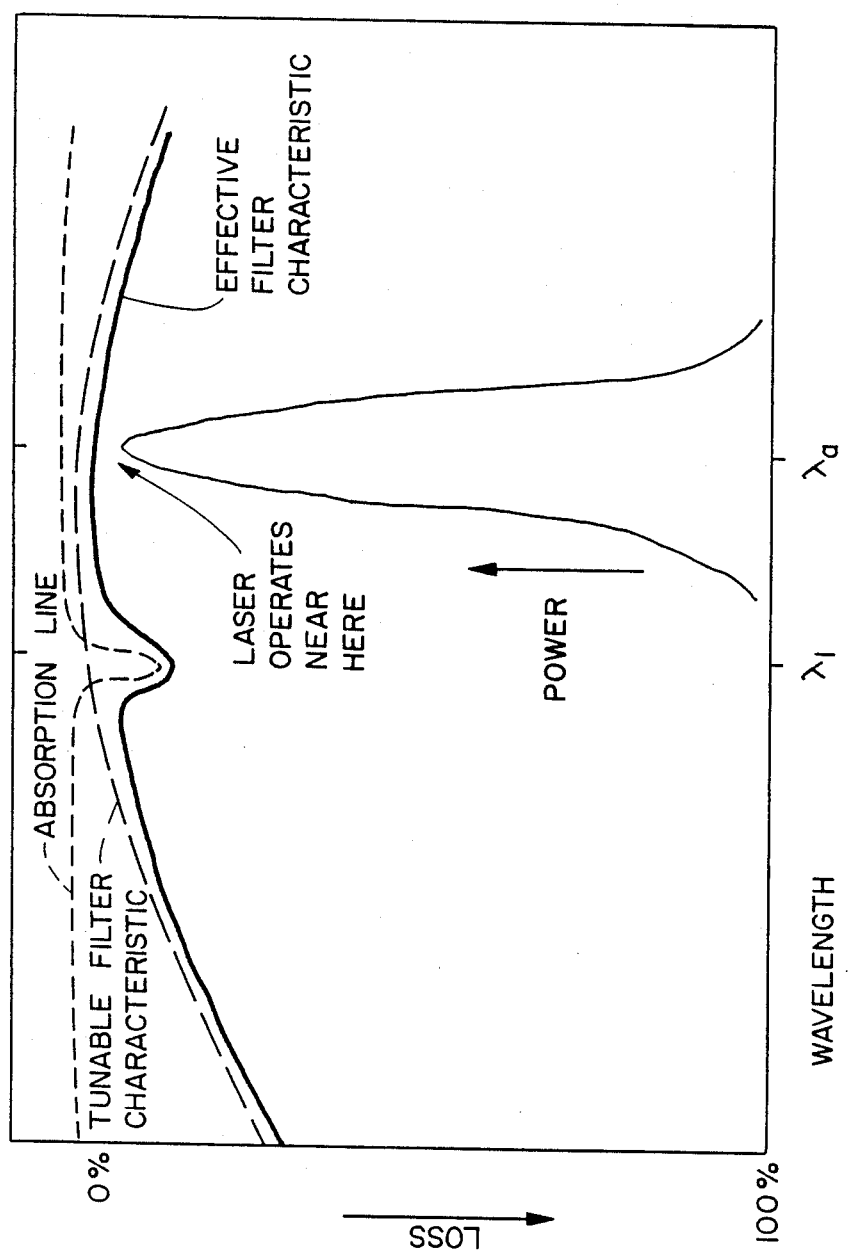
FIG._2.

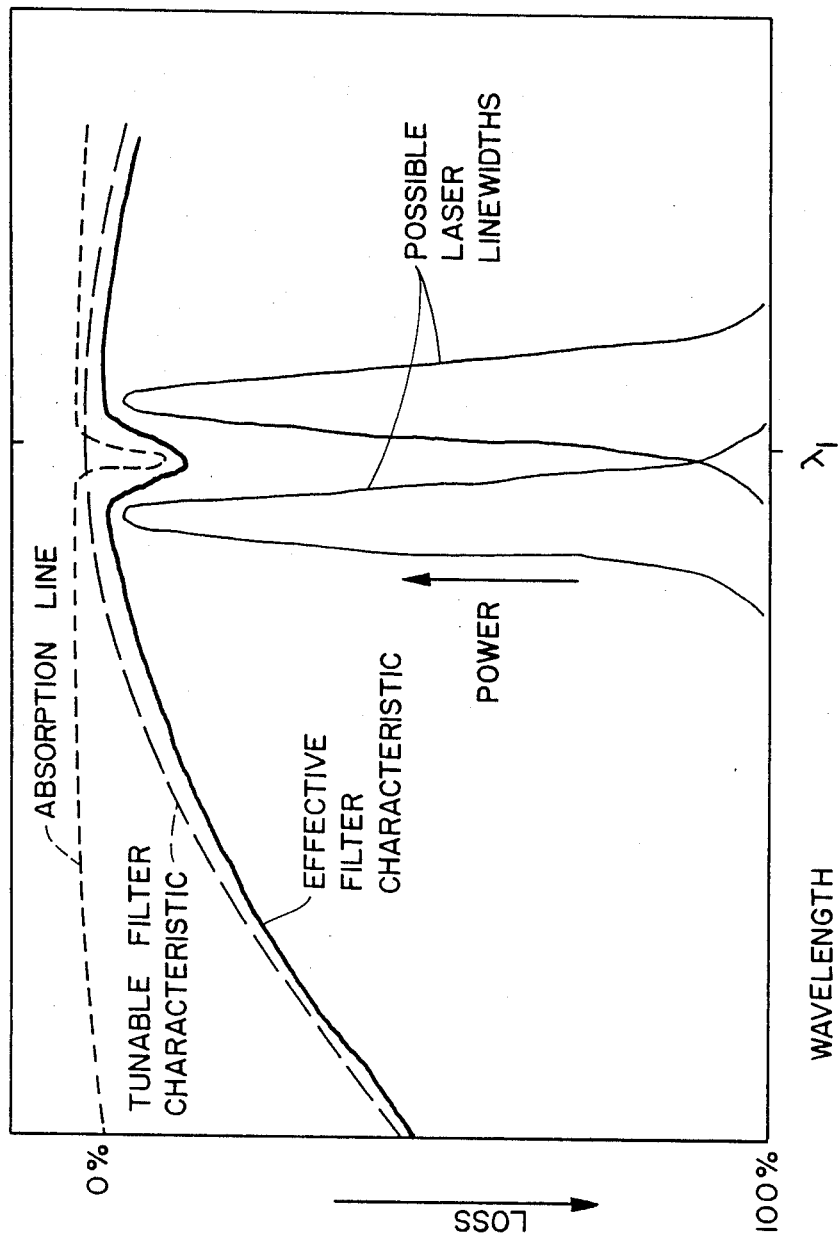
FIG._3.

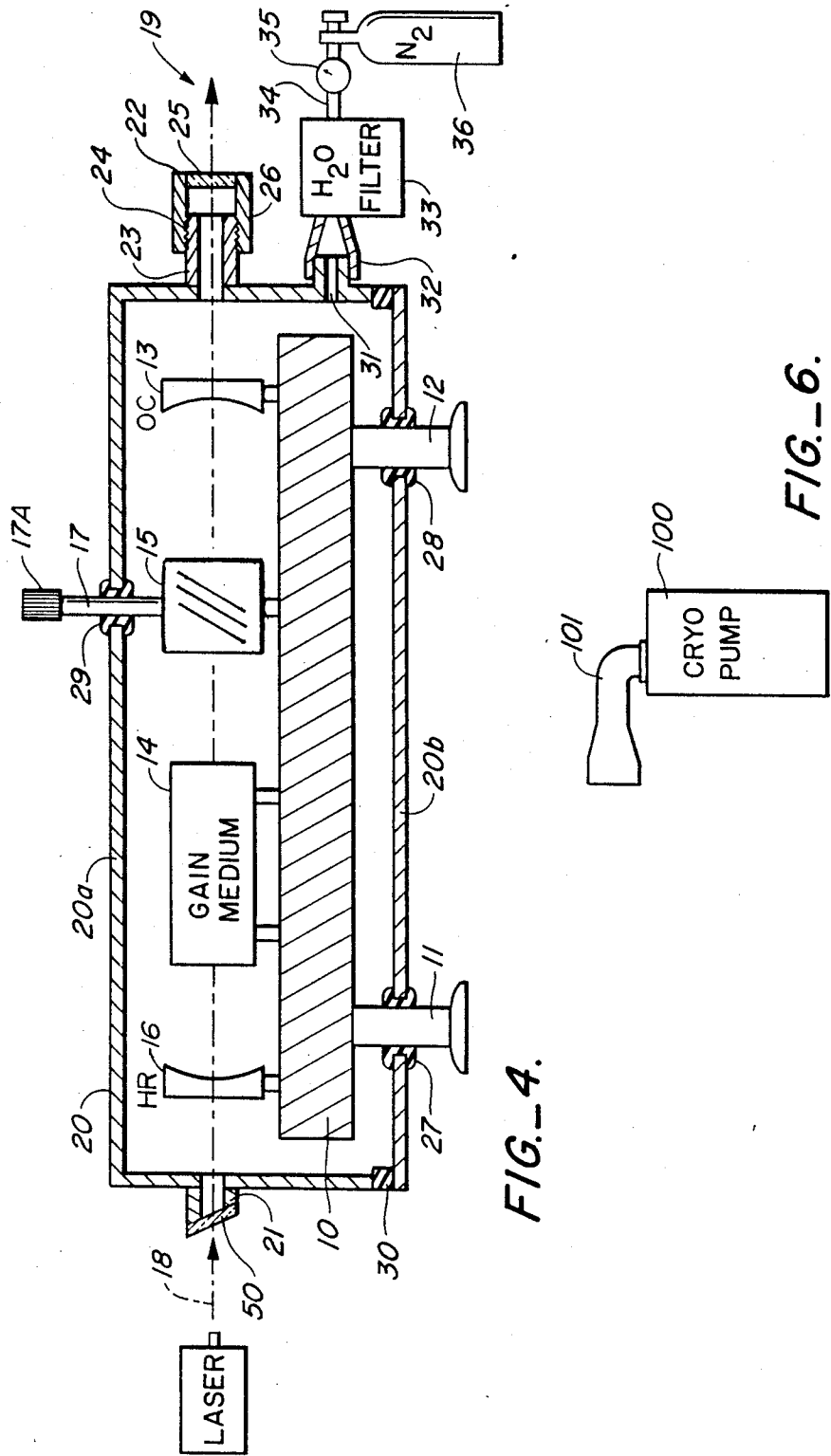
FIG._4.
FIG._6.

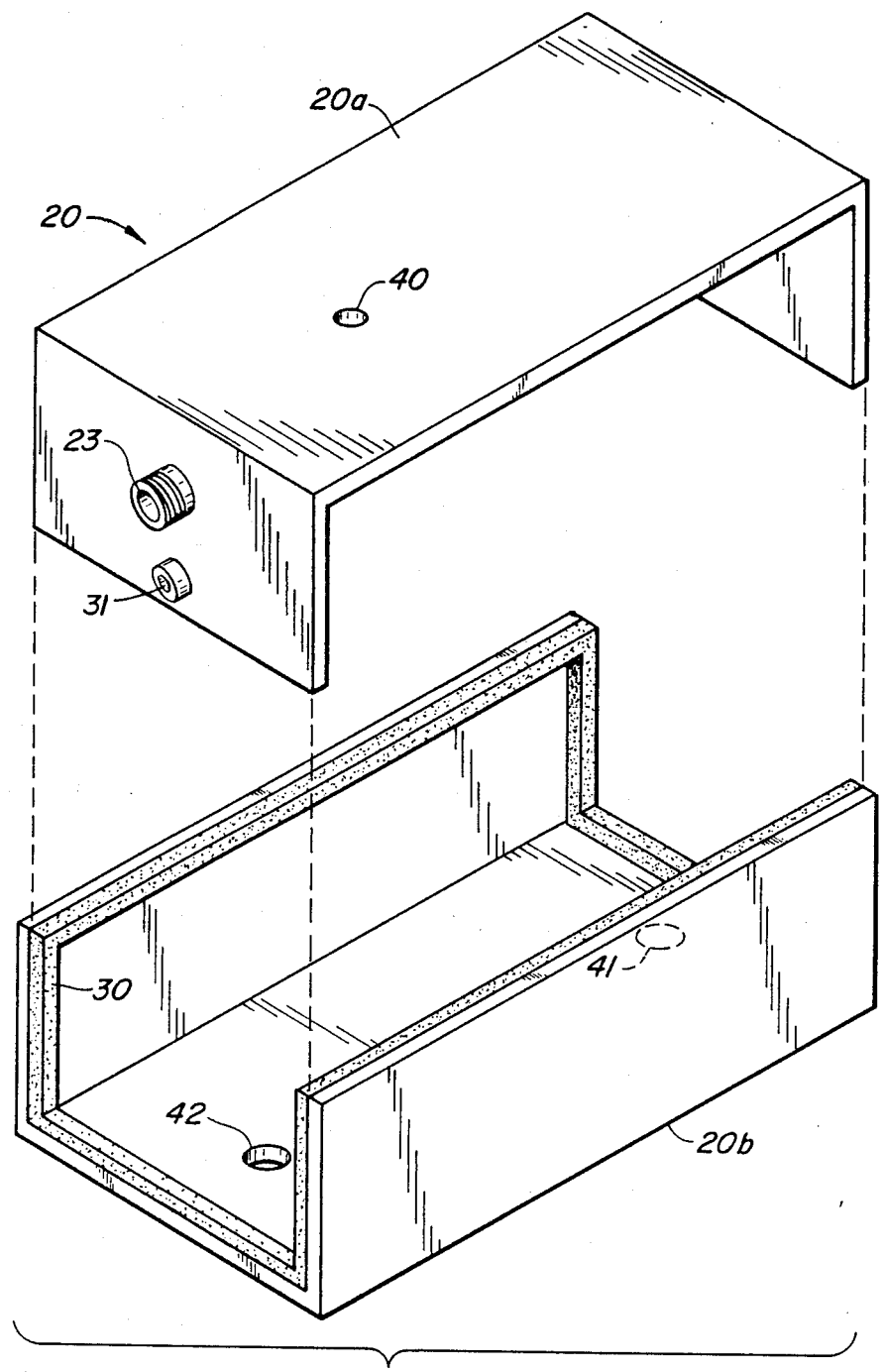
FIG._5.

PURGED CAVITY SOLID STATE TUNABLE LASER

FIELD OF THE INVENTION

The present invention relates to tunable solid state lasers, and more particularly to solid state lasers having a wide tuning range such as those using titanium:sapphire gain media.

DESCRIPTION OF RELATED ART

Some tunable solid state lasers, in particular those using titanium:sapphire as a gain medium, have a broad tuning range, for example, as much as several hundred nanometers (or approximately 100 terahertz). These lasers typically use a tunable filter within the resonant cavity to restrict the operating wavelength to a narrow band by introducing increasing optical loss at wavelengths other than the desired operating wavelength. One common form of such a filter is a Lyot filter, commonly known to those skilled in the art as a "birefringent filter". Although the passive linewidth of such a filter may be as broad as approximately 1 terahert, the operating wavelength band or linewidth of the laser may be restricted to only a few tens of gigahertz by the process of so-called spectral condensation, a phenomenenon common to homogeneously broadened laser gain media.

Ideally, as the center frequency, or frequency of minimum loss, of the filter is changed smoothly, correspondingly the operating frequency of the laser will smoothly follow the center frequency of the tunable filter, at all times maintaining the feature of spectral condensation, that is, a narrowing of the operating linewidth of the laser as compared to that of the birefringent filter. However, smooth tracking of the birefringent filter center frequency and laser operating frequency is possible only if there are no other additional frequency dependent loss elements in the laser cavity. For instance, a material in the cavity which absorbs light in an absorption line around a wavelength $\lambda_1$ and with a linewidth narrower than the tunable filter linewidth, will tend to prevent the laser from oscillating at the wavelength $\lambda_1$. This is most prominently observed when the center frequency of the birefringent filter is scanned through the frequency $\lambda_1$ in anticipation of a smooth change in laser operating wavelength following that of the tunable filter center frequency. As shown in FIG. 1, when the tunable filter center frequency is at a wavelength $\lambda_a$ well below the wavelength $\lambda_1$, the effective frequency-dependent intracavity filter loss characteristic (the point-by-point sum of the two filter losses) is shown by the solid line and the laser will oscillate at a wavelength near the desired wavelength $\lambda_a$. Similarly, if the tunable filter center frequency is at a wavelength $\lambda_b$, then the effective filter characteristic is shown in FIG. 2 and results in an operating frequency near $\lambda_b$. However, if the filter center frequency is adjusted to $\lambda_1$, the effective intracavity filter characteristic will be that as shown in FIG. 3. In this case, the wavelength of minimum loss is not that of $\lambda_1$ but one or more wavelengths at either side of the desired operating wavelength. This is evidenced by a wavelength "hop" in the laser operating wavelength as the center frequency of the tunable filter is scanned through wavelength $\lambda_1$.

The amount of loss for a loss line that is narrower than the filter line, which is required to cause a discontinuity in the tuning range of a given laser, is very slight. Accordingly, there are a wide variety of sources of loss that can cause discontinuities in a given laser cavity. For instance, as described in co-pending U.S. Patent Application Ser. No.: 07/319,980, Filed: Mar. 7, 1989, entitled: APPARATUS FOR ALIGNING THE OPTIC AXIS OF AN INTRA-CAVITY BIREFRINGENT ELEMENT, AND TUNABLE LASER USING SAME, misalignment of the crystallographic axis of the gain media can cause tuning discontinuities. Q-switches, reflectors or other optical elements in the cavity could also cause such discontinuity.

Because the source of the loss is often very difficult to isolate in laser resonators, designers have focused on the filters to handle problems with loss lines within a given cavity. In particular, prior art systems have tended to attempt to find filters which have a band pass narrower than the loss line. For instance, a thin etalon can be used to enhance the birefringent filter, and make a filter line narrower than the loss line.

It is desirable to improve the continuity of the tuning range of solid state lasers by eliminating sources of loss within the laser resonant cavities.

SUMMARY OF THE INVENTION

The present invention provides an improved tunable solid state laser in which the resonant cavity is purged with an inert gas, such as nitrogen, to eliminate absorption lines in the cavity due to water vapor, oxygen or other gases in the air. It is found that although the absorption lines due to water vapor in air causes less than 0.05% absorption, the lines are very narrow, typically below 10 GHz. Because the lines are narrower than the filter line, a discontinuity in the output beam tuning range is detected.

According to one aspect of the invention, a tunable solid state laser having a titanium:sapphire gain medium and a birefringent filter mounted within a resonant cavity is provided. The resonant cavity is longitudinally pumped. The cavity is enclosed in a casing which has a small hole admitting the pump beam into the resonant cavity, and a small window screwed on with anti-reflection coating allowing the laser output to exit the casing. A Brewster window will be mounted over the small hole for the pump beam in the preferred system. The casing is maintained at a positive pressure (about 0.1 lbs/in² over atmospheric pressure) of nitrogen gas during operation of the laser to purge the resonant cavity of air.

The casing need not be completely sealed. In fact, the hole admitting the pump beam could be left open, allowing gas to escape. Further, a shaft connected to the birefringent filter passes through the casing to allow tuning of the filter. This shaft is sealed with snug grommets, rather than air tight seals. Likewise, the legs which support the base of the resonant cavity are snugly sealed to the casing with grommets, rather than air tight seals.

A gas fitting is mounted on the casing and connected to a filter which removes water vapor from the source of nitrogen gas. The filter is then coupled to a commercially available bottle of nitrogen gas.

It is found that by removing the very small amount of water vapor and oxygen found in the air, the tuning range of a titanium:sapphire laser has no discontinuity. This is quite a surprising result because of the minimal amount of water vapor, or other loss causing materials, present in air, and the variety of other sources of absorption lines which could be found in such laser systems.

Other aspects and advantages of the present invention can be seen upon review of the drawings, the detail description and the claims which follow.

BRIEF DESCRIPTION OF THE FIGURES

FIG. 1 is a graph of wavelength versus loss used in illustrating the cause of tuning discontinuities, eliminated by the present invention.

FIG. 2 is a graph of wavelength versus loss used in illustrating the cause of tuning discontinuities, eliminated by the present invention.

FIG. 3 is a graph of wavelength versus loss used in illustrating the cause of tuning discontinuities, eliminated by the present invention.

FIG. 4 is a schematic diagram of a purged cavity solid state laser system according to present invention.

FIG. 5 shows that perspective view of the casing for the resonant cavity according to the present invention.

FIG. 6 shows a vacuum pump for use in an alternative system.

DETAILED DESCRIPTION

A detailed description of a preferred embodiment of the present invention is provided with respect to the figures.

FIG. 4 is a schematic diagram of a tunable laser system according to the present invention. The laser system includes a laser base 10 made of a rigid material. The laser base is mounted on legs 11 and 12 which support the system. Likewise the laser base 10 supports an output coupler 13, a gain medium 14, a birefringent filter 15, and a high reflecting back mirror 16. The output coupler 13 and the high reflecting mirror 16 define a resonant cavity. The gain medium 14 is a tunable solid state material such as titanium:sapphire.

The gain medium 14 is mounted in the resonant cavity using mechanisms such as disclosed in copending U.S. Patent Application, Ser. No.: 07/319,980, Filed: Mar. 7, 1989, entitled: APPARATUS FOR ALIGNING THE OPTIC AXIS OF AN INTRA CAVITY BIREFRINGENT ELEMENT, AND TUNABLE LASER USING SAME.

The birefringent filter 15 allows for single wavelength selection for the output beam of the laser. A shaft 17 coupled to a knob 17a extends from the birefringent filter 15 upward. The shaft is rotated to adjust the birefringent filter 15 for wavelength selection.

The resonant cavity illustrated in FIG. 4 is a simplified schematic diagram. The preferred system is implemented according to design techniques such as those described in U.S. Pat. No. 4,894,831, Ser. No.: 07/241,698, Filed: 09/07/88, entitled: LONGITUDINALLY PUMPED LASER OSCILLATOR.

The resonant cavity receives exciting energy from a longitudinally supplied pump beam 18. The pump beam passes through the back mirror 16 into the resonant cavity and the gain medium 14. Output beam 19 is supplied through the output coupler.

The resonant cavity is mounted within an enclosure formed by casing 20. The casing includes an opening 21 covered by Brewster window 50 allowing the pump beam to enter the resonant cavity through back reflector 16. An output window 22 is mounted opposite the output coupler 13 on a tubular extension 23 of the casing 20 which has threaded end 24. A window 22 with an antireflective coating 25 is mounted on a mate 26 to the extension 23.

The legs 11 and 12, and the shaft 16 of the birefringent filter 15 are snugly fitted to the casing with grommets 27, 28 and 29 which are made of a pliable material such as urethane. The grommets 27, 28, 29 absorb shook and vibration to limit transmittance of the shock or vibration from the casing 20 to the laser base 10.

The casing 20 consists of a top part 20a and a bottom part 20b, which are fitted with a gasket 30 made of a closed cell urethane foam. This gasket 30 is illustrated more clearly in FIG. 5.

The atmosphere within the casing 20 is purged with dry nitrogen gas through fitting 31.

To purge the enclosure, the fitting 31 is coupled by tube 32 to a water filter 33. The water filter is coupled through tube 34 to a flow meter 35 and a bottle of nitrogen gas 36. The water filter 33 removes any residual water vapor in the nitrogen gas from bottle 36. Thus, dry nitrogen is pumped into the casing 20 at positive pressure to remove the atmospheric air and water vapor from the resonant cavity. The output window 22 can be unscrewed to speed the initial purging of the cavity. It is then tightened for operating of the laser.

FIG. 5 illustrates the implementation of the casing 20. As mentioned above, the casing 20 includes a top part 20a and a bottom part 20b. The top part includes opening 40 for the shaft 16 of the birefringent filter and supports the extension 23 to support the window 25. The bottom part includes openings 41 and 42 for legs 11 and 12. A gasket 30 lines the edge of the bottom part 20b to provide a snug fit for the top 20a and the bottom part 20b. The gasket is formed of a closed cell urethane foam, or another inert material.

Although the resonant cavity schematically illustrated in FIG. 4 of the present invention shows openings in the casing for a shaft for the tuning of the birefringent filter and for legs supporting the laser base, other openings fitted with grommets on the casing 20 may be needed. For instance an opening for allowing flow of cooling water into the base for the gain medium could be required.

In an alternative system, all controls could be mounted within the casing, with motors for adjustment, to reduce mechanical casing feedthroughs.

It would be recognized by those skilled in the art that a casing 20 could be implemented using a wide variety of techniques that allow creation of a positive pressure of a transparent gas within the resonant cavity. Alternatively, where the volume of purge gas is a problem, the casing can be more carefully sealed to reduce the volume of outflow or tightly sealed and purged by an evacuate/fill cycle. However, the techniques disclosed in the present invention are found to provide significant improvement in the tunable laser system.

Of course, any gas transparent in the tuning range of the laser, such as the noble gases for a Ti:Sapphire laser, could be used in place of nitrogen.

It is found that using the purged cavity according to the present invention, a smooth tuning of Ti:Sapphire laser is achieved over the entire range of nearly 0.65 to past 1.1 microns The present invention can be applied as well to lasers with other gain media, such as F-center crystals, alexandrite, Chromium doped crystalline hosts (e.g. Cr: LiCAF), and dyes, to extend the range of tuning very broadly.

In an alternative system, vacuum seals could be used for the gasket 30 and the grommets 27, 28, 29, and the gas source replaced by a vacuum pump as shown in FIG. 6. The vacuum pump shown in FIG. 6 consists of a vacuum pump 100, connected to fitting 31 (FIG. 4) by tubing 101. In this alternative, the cavity is purged by evacuating it.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined bY the following claims and their equivalents.

What is claimed is:

1. A tunable laser, comprising:
a resonant cavity, including an output coupler;
a solid state gain medium, mounted within the resonant cavity;
means for supplying excitation energy to the gain medium;
tuning means, mounted within the resonant cavity, for selecting a wavelength of oscillation in the resonant cavity over a range of wavelengths;
an enclosure surrounding the resonant cavity, the solid state gain medium and the tuning means, and having a gas port;
means, coupled to the gas port of the enclosure, for purging the enclosure of air.

2. The laser of claim 1, wherein the means for purging comprises:
means for filling the enclosure with gas transparent over the range of wavelengths.

3. The laser of claim 1, wherein
the means for supplying excitation energy includes means, external to the enclosure, for supplying a pump beam into the gain medium; and
the enclosure has an opening for receiving the pump beam.

4. The laser of claim 3, wherein the opening allows gas flow out of the enclosure, and the means for purging maintains a positive pressure gradient from inside to outside the enclosure of a gas transparent over the range of wavelengths.

5. The laser of claim 1, wherein the enclosure includes a window, transparent over the tuning range of the laser and in alignment with the output coupler, through which an output beam exits the enclosure.

6. The laser of claim 2, wherein the gas consists essentially of nitrogen.

7. The laser of claim 1, wherein the gain medium comprises Ti:Sapphire.

8. The laser of claim 1, wherein the means for purging comprises means for evacuating the enclosure.

9. A tunable laser, comprising:
a laser base with means for supporting the laser base;
a resonant cavity, including an output coupler mounted on the laser base;
a solid state gain medium, mounted within the resonant cavity on the laser base;
tuning means, mounted within the resonant cavity on the laser base, for selecting a wavelength of oscillation in the resonant cavity over a tuning range of wavelengths;
an enclosure, surrounding the resonant cavity, the solid state gain medium and the tuning means, and having a gas port, a window transparent to the pump beam for receiving the pump beam into the enclosure, means external to the enclosure, for supplying a pump beam into the gain medium; a window transparent over the tuning range aligned with the output coupler for transmitting an output beam; and
means, coupled to the gas port of the enclosure, for purging the enclosure of air with a gas transparent over the tuning range.

10. The laser of claim 9, wherein the gas consists essentially of nitrogen.

11. The laser of claim 9, wherein the gain medium comprises Ti:Sapphire and the tuning range comprises wavelengths from less than 0.7 to more than 1.0 microns.

12. The laser of claim 9, wherein the window transparent to the pump beam comprises an opening in the enclosure which allows gas flow out of the enclosure.

13. The laser of claim 9, wherein the window transparent to the pump beam comprises a Brewster window.

14. The laser of claim 9, wherein the enclosure further surrounds the laser base.

15. A tunable laser, comprising:
a laser base with means for supporting the laser base;
a resonant cavity, including an output coupler, mounted on the laser base;
a titanium:sapphire solid state gain medium, mounted within the resonant cavity on the laser base;
tuning means, mounted within the resonant cavity on the laser base, for selecting a wavelength of oscillation in the resonant cavity over a tuning range of wavelengths;
an enclosure, surrounding the laser base, the resonant cavity, the solid state gain medium and the tuning means, and having a gas port, a window transparent to the pump beam for receiving the pump beam into the enclosure, a window transparent over means, external to the enclosure, for supplying a pump beam longitudinally into the gain medium; the tuning range aligned with the output coupler for transmitting an output beam; and
means, coupled to the gas port of the enclosure, for supplying, and maintaining a positive pressure relative to atmospheric pressure of, dry nitrogen gas within the enclosure.

* * * * *